United States Patent [19]
Tajima et al.

[11] Patent Number: 5,238,656
[45] Date of Patent: Aug. 24, 1993

[54] TREATMENT EQUIPMENT OF EXHAUST GAS CONTAINING ORGANIC HALOGEN COMPOUNDS

[75] Inventors: Masahiro Tajima; Masashi Harada, both of Shinnanyo, Japan

[73] Assignee: Tosoh Corporation, Shinnanyo, Japan

[21] Appl. No.: 781,741

[22] Filed: Oct. 23, 1991

[30] Foreign Application Priority Data

Oct. 26, 1990 [JP] Japan ............... 2-287149
Oct. 2, 1991 [JP] Japan ............... 3-280299

[51] Int. Cl.$^5$ ................ B01D 50/00; C01B 7/00
[52] U.S. Cl. ..................... 422/171; 422/172; 422/177; 423/240 R; 423/240 S
[58] Field of Search ........ 422/171, 172, 177, 179, 422/180, 211; 423/240 R, 240 S, 245.3, 481, 488

[56] References Cited

U.S. PATENT DOCUMENTS

| | | | |
|---|---|---|---|
| 4,059,683 | 11/1977 | Lindberg et al. | 423/481 |
| 4,209,496 | 6/1980 | Carpenter et al. | 423/240 S |
| 4,760,044 | 7/1988 | Joy, III et al. | 502/303 |
| 4,935,212 | 6/1990 | Jacob | 423/240 S |
| 5,008,090 | 4/1991 | Joy, III et al. | 423/212 |
| 5,055,442 | 10/1991 | Osaka et al. | 502/439 |
| 5,082,820 | 1/1992 | Mitsui et al. | 502/350 |

FOREIGN PATENT DOCUMENTS

| | | |
|---|---|---|
| 0259105 | 3/1988 | European Pat. Off. . |
| 0387417 | 9/1990 | European Pat. Off. . |
| 3841847 | 12/1988 | Fed. Rep. of Germany . |
| 4003668 | 8/1990 | Fed. Rep. of Germany . |
| 54-22792 | 8/1979 | Japan . |
| 1141919 | 6/1986 | Japan .............. 423/240 S |
| 3091128 | 4/1988 | Japan .............. 423/240 |
| 3091129 | 4/1988 | Japan .............. 423/240 |
| 2-83017 | 3/1990 | Japan . |
| 3-42015 | 2/1991 | Japan . |
| 3-106419 | 5/1991 | Japan . |
| 9013352 | 11/1990 | World Int. Prop. O. . |

OTHER PUBLICATIONS

Patent Abstracts of Japan, "Treatment of Pyrolysis Gas of Organic Waste Material," vol. 7, No. 7 (C-144) (1152), Jan. 12, 1983, & JP-A-57 165 021, Oct. 9, 1982, H. Hirokawa, et al.

*Primary Examiner*—Robert J. Warden
*Assistant Examiner*—Christopher Y. Kim
*Attorney, Agent, or Firm*—Oblon, Spivak, McClelland, Maier & Neustadt

[57] ABSTRACT

A treatment equipment of exhaust gas containing organic halogen compounds using a catalytic decomposition unit packed with decomposition catalyst for organic halogen compounds having strong acidic sites and a wash tower for removing hydrogen halide gas generated by the decomposition of the organic halogen compounds.

11 Claims, 1 Drawing Sheet

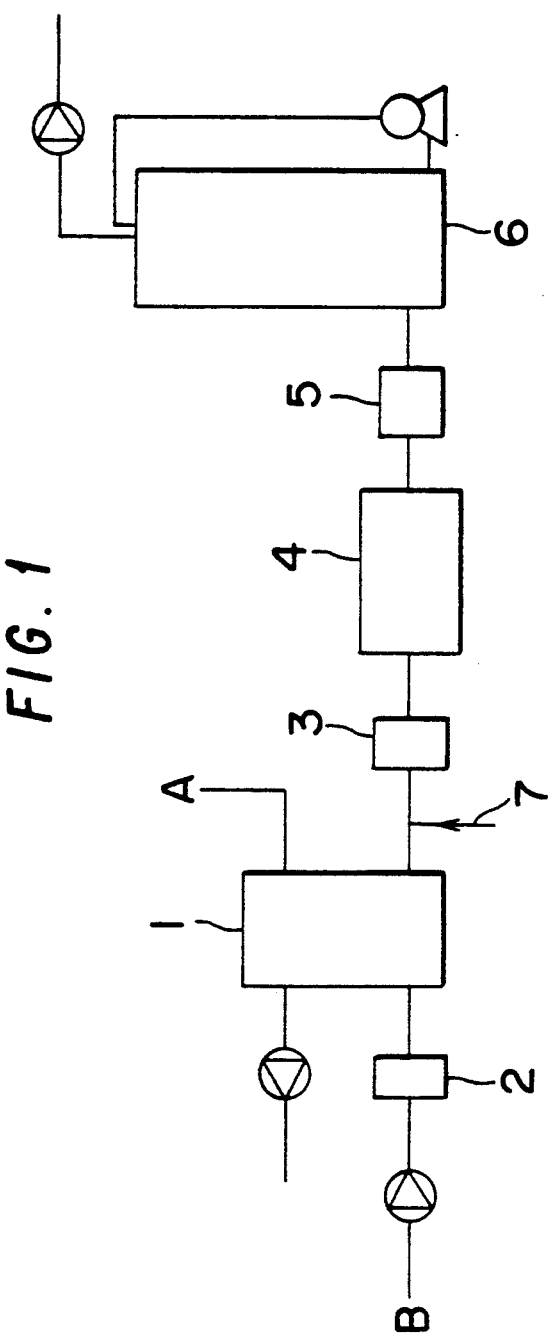

TREATMENT EQUIPMENT OF EXHAUST GAS CONTAINING ORGANIC HALOGEN COMPOUNDS

BACKGROUND OF THE INVENTION

The present invention relates to a treatment equipment of exhaust gas containing organic halogen compounds. In more detail, it relates to an equipment for introducing exhaust gas containing organic halogen compounds into a catalytic decomposition unit to decompose and then removing hydrogen halide decomposition product of the organic halogen compounds in a wash tower.

The organic halogen compounds are utilized in various fields not only a raw material of chemical substances, but also as washing agents etc. At that time, exhaust gas containing organic halogen compounds is emitted. Some of these organic halogen compounds include compounds having toxicities such as carcinogenicity etc., source substances of air pollution and further compounds having been considered as source substances of ozonosphere destruction and greenhouse effect being problems in the global enviroment, consequently, the development of the technology to suppress the emission has been promoted.

As a treatment equipment of exhaust gas containing organic halogen compounds, an adsorption recovery method is conventionally known. Using an adsorption recovery method, however, the treatment of organic halogen compounds recovered becomes problematic. While direct recycling is possible in the case of the purity of recovered material being high, usually impurities are most often incorporated that makes it necessary to purify by distillation before recycling. Moreover, among the recovered materials, those incapable of recycling are required to be treated as waste liquors leading to a problem of cost.

Besides the adsorption recovery method, direct combustion method is also considered to be a treatment method. The direct combustion method however requires a temperature of higher than 800° C. and a temperature of higher than 1000° C. becomes necessary depending on the kind of organic halogen compounds. Moreover, since the direct combustion method is performed at high temperature, thermal NOx is generated and further there is a possibility dioxin is produced resulting in a cause of new pollution problems.

As described above, the treatment method of exhaust gas containing organic halogen compounds has problems in the post-treatment and has also a danger of becoming a cause of new pollution problems, hence the development of more effective treatment equipment of exhaust gas containing organic halogen compounds is desired.

As a result of investigations on the treatment method of exhaust gas containing organic halogen compound, the inventors have succeeded in effectively treating an exhaust gas containing organic halogen compounds at low temperature by introducing the exhaust gas into a catalytic decomposition unit after concentrating the organic halogen compounds in a concentration unit when the organic halogen compounds is at a low concentration or is directly introduced when at high concentration and then hydrogen halide is removed in a wash tower.

SUMMARY OF THE INVENTION

The invention provides a treatment equipment for exhaust gas containing an organic halogen compound, comprising a catalytic decomposition unit packed with decomposition catalyst for organic halogens having strong acidic sites and a wash tower for removing hydrogen halide produced by the decomposition of organic halogen compounds.

BRIEF DESCRIPTION OF THE DRAWING

FIG. 1 is one example of the flow sheet of the equipment of the invention.

DETAILED DESCRIPTION OF THE INVENTION

The invention is illustrated in detail by the following.

The organic halogen compounds intended for the treatment in the invention are compounds containing at least one kind of chlorine, fluorine and bromine. For example, carbon tetrachloride, chloroform, chloroethylene, 1,1,1-trichloroethane, 1,2-dichloroethane, tetrachloroethylene, trichloroethylene, chloroethylene, dichloromethane, trichlorofluoromethane, dichlorodifluoromethane, 1,1,2-trichloro-1,1,2-trifluoroethane, methyl bromide, etc. can be mentioned.

When the concentration of organic halogen compounds in the exhaust gas is low, the organic halogen compounds are concentrated using a concentration unit and then are introduced into the catalytic decomposition unit. The concentration necessary to concentrate is preferably not higher than 1000 ppm and more preferably not higher than 500 ppm. As the concentration units, common honeycomb-rotor type concentration unit, packing type adsorption unit, etc. can be used and they are not particularly limited. Moreover, as the adsorbents to be used for the concentration unit, granular activated carbon, fibrous activated carbon, zeolite, etc. all can possibly be used.

The organic halogen compounds concentrated by the concentration unit are introduced into the catalytic decomposition unit.

As a method for applying temperature required for the catalytic decomposition in the catalytic decomposition unit, a method of heating the gas before introducing it into the catalytic decomposition unit or a method of heating the catalyst tower itself can be used. For the methods of heating the gas before introducing it into the catalyst unit, direct heating and indirect heating by an electric heater, combustion burner, high-pressure steam or the like can be used. In the case of flammable organic halogen compounds at high concentration, however, indirect heating is preferable because of the danger of explosion. Moreover, in the methods of directly heating the catalyst bed, a method of heating the outer wall of the catalyst tower by electric heater or combustion burner, a method of embedding an electric heater in the catalyst bed, a method of embedding a pipe passing through gas heated by combustion burner etc. in the catalyst bed, and the like are included. Moreover, as the materials of catalytic decomposition tower, use of acid-resistant metals such as Ni, Inconel, Ni-Cr alloy and SUS 310S or acid-resistant materials such as ceramic coating and glass lining is preferable.

The type of the catalyst tower for the catalytic decomposition unit is not particularly limited and various forms such as packing type, radiant flow type and monolithic type can be used.

The decomposition catalysts for organic halogens to be used in the invention have ultra-strong acidic sites and are one kind or not less than two kinds of oxides selected from Si, Al, Ti, Zr, B, Nb, Cr, Ga, Mo, W, Y, Cu, Sr, La, Fe, Mn and P. For example, zeolite, silica.alumina, silica.titania, titania.zirconia, alumina.boria, niobium oxide, etc. can be mentioned. Moreover, sulfuric acid or phosphoric acid being a nonvolatile acid may be carried on these oxides to increase the ultra-strong acidic sites.

Since said catalyst alone is sometimes poisoned by halogens, it is necessary to give durability against halogens by ion-exchanging or allowing noble metals, transition metals, etc. to be carried on such catalyst. Furthermore, the increased catalytic activity can also be expected through the ion-exchange or carrying of noble metals and transition metals.

As the modifying metals, Cu, Fe, Co, Ni, Mn, Pt, Pd, Rh, Au, Ag, Ir, W, Mo, V, Cd, Sn and Pb can be mentioned and one kind or not less than two kinds of these are used. The amount of modifying metal for ion-exchange or carrying is preferable 0.05 to 20 wt. %.

These decomposition catalysts for organic halogen compounds are solid acid catalysts having strong acidic sites. The strong acidic sites in the invention are acidic sites as defined that, when determining the desorption of pyridine under increasing temperature at a temperature-rising velocity of 10° C./min while flowing He gas as a carrier gas at a flow rate of 10 ml/min, after absorbed pyridine onto the catalyst at 300° C., pyridine is desorbed at a temperature of not lower than 600° C. Moreover, the type of acidic sites of solid acid catalysts may be either acidic sites of Brönsted acid or those of Lewis acid.

Examples of decomposition catalysts for organic halogens include Co-carrying H-type mordenite, Fe-carrying H-type mordenite, W-carrying titania.Zirconia composite oxides, Pd-carrying titania.Zirconia composite oxides, Cr-carrying titania.zirconia composite oxides, Pt-carrying alumina.boria bomposite oxides, Pt-carrying niobium oxide, etc.

With regard to the shape of the catalysts, various forms such as honeycomb shape, sphere shape, cylinder shape, thin plate shape and net shape can be used, but, in the case of large quantities of treating gas, the honeycomb shape with low pressure loss is preferable. Moreover, the decomposition temperature is 100° to 600° C., preferably 150° to 450° C., though different depending on the organic halogen compounds.

As the time of catalytic decomposition, it is required to add steam depending on the type of organic halogen compounds. For example, with compounds such as carbon perhalide containing no hydrogen atom, the catalytic oxidative decomposition is difficult and requires high temperature. However, they are easily decomposed by adding steam. In the case of carbon tetrachloride, 600° C. or higher temperature is required for the oxidative decomposition, but 100% decomposition can be achieved at a temperature of 200° C. if hydrolysis is carried out by adding steam.

Moreover, in the case of decomposing the organic halogen compounds, the oxidative decomposition by oxygen most often generates halogen gas and the halogen gas generated is more difficult to remove than hydrogen halide. By adding steam, however, it is possible to preferentially produce hydrogen halide, which can be easily removed by water or aqueous solution of alkali. As described, the presence of steam in the reaction gas has many advantages. The levels of oxygen and steam to be added are only necessary to be not less than the theoretical quantities to convert carbon atoms and halogen atoms contained in organic halogen compounds to carbon dioxide and hydrogen halide, which may preferably be more than 1.5 times as much as the theoretical quantities. For example, in the case of a gas containing 1000 ppm of carbon tetrachloride, oxygen and steam to be added may be not less than 1000 ppm and not less than 2000 ppm, preferably not less than 1500 ppm and not less than 3000 ppm, respectively.

It is preferable to heat-exchange between gas decomposed in the catalytic decomposition unit and gas before decomposition by a heat-exchanger, which serves to conserve heating energy for the gas. The materials of heat-exchanger are preferable acid-resistant as made of acid-resistant metals, ceramics, glass lining or the like, because of hydrogen halide contained in the gas.

The gas decomposed in the catalytic decomposition unit is introduced into a wash tower, where hydrogen halide being a decomposition product of organic halogen compounds is removed by water or aqueous solution of alkali.

For the wash tower, a common method of flowing water or aqueous solution of alkali from the top of tower and providing a gas inlet at the bottom and a gas outlet at the top is preferable. Moreover, a method of making wider contact area of gas with fluid by packing the packing material inside the wash tower is preferable. For the packing materials, those made of plastics or ceramics are preferable because of the danger of hydrogen halide dissolved becoming acidic aqueous solution. With respect to the wash liquor, there are a method of discharging it as it is after washing and a method of using it by circulating with a pump. The former is preferable in the case of water using as a wash liquor and the latter is preferable in the case of aqueous solution of alkali using as a wash liquor. When using the wash liquor by circulation, the acidity increases by hydrogen halide absorbed to make the absorption efficiency poor, hence it is preferable to maintain the pH of the wash liquor by adequately adding alkali and further to always discharge a part of wash liquor and replace it with fresh wash liquor. Halogenous ions of chlorine, fluorine and bromine are contained in the discharged liquor. Among these, fluorine must be removed because the dischargeable concentration of it is laid down by the effluent regulation. As the methods of removing fluorine ions, there are a method of contacting a substance capable of forming insoluble salt by reacting with fluorine with wash liquor, and the like. For example, by allowing the wash liquor to contact with calcium chloride, water-insoluble calcium fluoride is produced, which can be recovered as precipitates.

In this decomposition reaction, carbon monoxide is sometimes produced depending on the type of organic halogen compounds and the type of decomposition catalysts for organic halogen compounds. Since carbon monoxide is harmful, it must be treated by some means or other. In the invention, a method of converting carbon monoxide to carbon dioxide by using oxidation catalyst is used. As the oxidation catalysts, those commonly used such as Pt-alumina, Pd-alumina, Pt-titania, Pd-titania, Pt-titania.zirconia composite oxides and Pd-titania.zirconia composite oxides can be used and are not particularly limited. The oxidation catalysts for carbon monoxide may be used by mixing with decomposition catalysts for organic halogen compounds or may be installed immediately after the catalytic decomposition unit or after the wash tower as an oxidation unit for carbon monoxide. When using by mixing with decomposition catalysts and when installing immediately after the catalytic decomposition unit, new heating means of gas is unnecessary, thus the use of extra energy is not needed because of the oxidation catalysts reacting with heated gas. In these cases, however, it is preferable to use the titania-based catalysts being hard to be poisoned by halogens as catalysts because of the existence of hydrogen halide in the gas. Moreover, when installed after the wash tower, the poisoning of catalysts is not significant because of the existence of little halogens, but it is required to heat to a temperature necessary for the reaction because of the decreased gas temperature near room temperature. It is preferable to recover the heat of reheated gas through heat-exchanger.

The invention relates to the cleaning of environment having now become a problem and enables to treat the organic halogen compounds emitted hitherto into the atmosphere as they are in exhaust gas.

The following examples illustrate the invention, but the invention is not limited thereto.

EXAMPLE 1

A gas containing 60 ppm of 1,1,1-trichloroethane and 2% of steam (other component: dried air) was used as an exhaust gas to be treated.

For the concentration unit (1), a honeycomb-rotor type concentration unit was used and, in the portion of rotor, activated carbon fibers molded into a honeycomb with a diameter of 60 cm and a length of 40 cm were used.

As the decomposition catalyst for the organic halogen compound, 5 wt. % of Cr carried on a titania.zirconia oxide composite (Ti/Zr=1.4), which was molded into cylindrical pellets with a diameter of 1.5 mm and a length of 5 mm was used. Moreover, as the oxidation catalyst for carbon monoxide, 1 wt. % of Pd carried on titania.zirconia composite oxides (Ti/Zr=1.4) and this further carried on a cordierite honeycomb (openings 2 mm) with a diameter of 30 cm and a length of 40 cm was used.

The exhaust gas to be treated (A) was introduced into the concentration unit (1) at 1500 m$^3$/hr and the number of revolutions of rotor was made to be 6 rph for operation.

The desorbing air (containing 2% steam) (B) was introduced into the desorptive portion of rotor at a flow rate of 150 m$^3$/hr, after being heated to 150° C. in a gas heater (2) for the concentration unit.

To this desorbed gas, steam was supplied from steam supply line (7) so that the steam becomes 2 wt. % and, after being heated to 400° C. in a gas heater (3) for the catalytic decomposition unit, this gas was introduced into the catalytic decomposition unit (4). For the catalytic decomposition unit (4), a vessel with a diameter of 55 cm and a length of 70 cm packed with said catalyst was used. Gas coming from the catalytic decomposition unit (4) was introduced into the oxidation unit (5) for carbon monoxide packed with said oxidation catalyst for carbon monoxide to oxidize carbon monoxide and then washed with 5% aqueous solution of NaOH in washing tower (6).

The composition of the exhaust gas after washing contained not more than 1 ppm of hydrogen chloride and 1,1,1-trichloroethane, chlorine gas and carbon monoxide were not present.

EXAMPLE 2

Except that, as a decomposition catalyst for organic halogen compound, 1 wt. % of Pd was carried on titania zirconia oxide composite (Ti/Zr=1.4), which was molded into cylindrical pellets with a diameter of 1.5 mm and a length of 5 mm was used, and the oxidation catalyst for carbon monoxide was not used, treatment was made by a method similar to Example 1.

The composition of exhaust gas after washing contained not more than 1 ppm of hydrogen chloride and 1,1,1-trichloroethane, chlorine gas and carbon monoxide were not present.

EXAMPLE 3

Except that carbon tetrachloride was used as an organic halogen compound and, as a decomposition catalyst for organic halogen compound, 2 wt, % of Co were carried on H-type mordenite (HSZ-620HOA), made by Tosoh Corp.), which was molded into cylindrical pellets with a diameter of 1.5 mm and a length of 5 mm using 20 wt. % of alumina as a binder, further the gas-heating temperature was made to be 220° C. and the oxidation catalyst for carbon monoxide was not used, treatment was made by similar method to Example 2.

The composition of exhaust gas after washing contained not more than 1 ppm of hydrogen chloride and carbon tetrachloride, chlorine gas and carbon monoxide were not present.

EXAMPLE 4

Except that 1,1,2-trichloro-1,2,2-trifluoroethane was used as an organic halogen compound and, as a decomposition catalyst for organic halogen compound, 2 wt. % of W were carried on a titania.zirconia oxide composite (Ti/Zr=1.4), which was molded into cylindrical pellets with a diameter of 1.5 mm and a length of 5 mm was used, treatment was made by a method similar to Example 1.

The composition of exhaust gas after washing contained not more than 1 ppm of hydrogen chloride and hydrogen fluoride, and 1,1,2-trichloro-1,2,2-trifluoroethane, chlorine gas, fluorine gas and carbon monoxide were not present.

What is claimed is:

1. A treatment equipment for purifying an exhaust gas containing organic halogen compounds, comprising a steam supply means connected to a steam supply source operatively connected to a catalytic decomposition unit packed with a decomposition catalyst for organic halogen compounds having strong acidic sites and said catalytic decomposition unit operatively connected to a wash tower for removing hydrogen halide gas generated by the decomposition of the organic halogen compounds.

2. The treatment equipment of claim 1, further comprising an organic halogen concentration unit operatively connected to said catalytic decomposition unit before said steam supply means.

3. The treatment equipment of claim 1 further comprising a heating means operatively connected before the catalytic decomposition unit.

4. The treatment equipment of any one of claim 1 through claim 3, further comprising an oxidation unit for carbon monoxide operatively connected after the catalytic decomposition unit.

5. The treatment equipment of any of claim 1 through claim 3, wherein the decomposition catalyst for the organic halogen compounds comprises at least one oxide of Si, Al, Ti, Zr, B, Nb, Cr, Ga, Mo, W, Y, Cu, Sr, La, Fe, Mn or P.

6. The treatment equipment of claim 5, wherein the decomposition catalyst for the organic halogen compounds carries sulfuric acid or phosphoric acid.

7. The treatment equipment of claim 5, wherein the decomposition catalyst for the organic halogen compounds further comprises at least one metal of Cu, Fe, Co, Ni, Mn, Pt, Pd, Rh, Au, Ag, Ir, W, Mo, V, Cd, Sn or Pb.

8. The treatment equipment of claim 7, wherein the decomposition catalyst is Cr and Pd, carried on a titania-zirconia oxide composite on a cordierite honeycomb.

9. The treatment equipment of claim 7, wherein the decomposition catalyst is Pd carried on a titania-zirconia oxide composite.

10. The treatment equipment of claim 7, wherein the decomposition catalyst is Co carried on H-type mordenite and alumina.

11. The treatment equipment of claim 7, wherein the decomposition catalyst is W carried on a titania-zirconia composite oxide.

* * * * *